Dec. 19, 1961  G. H. McLAUGHLIN ETAL  3,014,176
AIRBORNE ELECTROMAGNETIC PROSPECTING APPARATUS
Filed Feb. 1, 1957  2 Sheets-Sheet 1

INVENTOR
GEORGE H. MCLAUGHLIN
ANDREW STEVENS
JAN A. CHARUBA

Douglas S. Johnson
ATTY.

Dec. 19, 1961  G. H. McLAUGHLIN ETAL  3,014,176
AIRBORNE ELECTROMAGNETIC PROSPECTING APPARATUS
Filed Feb. 1, 1957  2 Sheets-Sheet 2

INVENTORS
GEORGE H. McLAUGHLIN
ANDREW STEVENS
JAN A. CHARUBA

By Douglas S. Johnson
ATTY.

United States Patent Office 3,014,176
Patented Dec. 19, 1961

3,014,176
AIRBORNE ELECTROMAGNETIC PROSPECTING APPARATUS
George H. McLaughlin, Willowdale, Ontario, and Andrew Stevens and Jan A. Charuba, Don Mills, Ontario, Canada, assignors, by mesne assignments, to Dominion Aerotronics Limited, Ontario, Canada
Filed Feb. 1, 1957, Ser. No. 637,752
14 Claims. (Cl. 324—4)

This invention relates to improvements in geophysical prospecting, and more particularly to an electromagnetic geophysical prospecting method and apparatus for use with aircraft.

The particular object of the invention is to improve, simplify and render more reliable present geophysical methods and apparatus used for carrying out airborne electromagnetic surveys for conductor or ore bodies.

As disclosed in United States Patent Number 2,652,530, in the carrying out of an electromagnetic survey an exploring magnetic field usually called the primary field is created by means of a transmitter coil. This exploring field will cut or link with a conductor body in the vicinity and will produce eddy currents in the body giving rise to a secondary magnetic field. A receiver or detector coil is employed to detect the existence of any such secondary field to thereby indicate the existence of such conductor body.

In stationary or ground electromagnetic methods steps may be readily taken to prevent or limit the coupling between the transmitter and receiver coils so that the relatively weak secondary fields can be detected in the presence of the relatively strong primary field.

In carrying out an electromagnetic survey from moving vehicles, particularly aircraft, however, the disturbances of the electromagnetic system occasioned by random relative movement of the transmitter and receiver coils produce signals in the receiver which usually are large in comparison with the signals produced by the secondary field so that such latter signals are frequently masked altogether. At the very best, with the methods and systems presently in use, it has been difficult to distinguish adequately between signals produced by variations in coil coupling and those produced by the secondary fields, so that there has been a great deal of uncertainty in the results of surveys carried out from moving vehicles or aircraft. Moreover, additional uncertainties are present since signals from valuable conductor bodies may be indistinguishable from signals produced by large bodies of relatively low conductivity such as swamps, muskeg, wet clay and the like.

It is therefore the object of this invention to provide more reliable results from electromagnetic surveys carried out from moving vehicles or aircraft, and in this connection, it is an object of the invention to minimize both the physical relative movement of the transmitter and receiver coils and further to minimize the effects of such relative movement of these coils as may occur.

Another important object is to provide a system capable of more adequately and accurately distinguishing the relatively good conductors which constitute commercial grade conductor ores or ore bodies from the relatively poorer conductors such as swamps and other non-commercial conductors.

Still another important object is to provide a simplified single frequency system which will render the carrying out of airborne surveys safe and effective.

In order to provide an effective method which will indicate conductors lying at any appreciable depth below the earth's surface or a distance below the position of the aircraft, it is necessary to provide a substantial separation between the transmitter and receiver coils. Usually it is desired to provide a separation of several hundred feet, and for this reason it is necessary to trail one or other of the transmitter and receiver coils behind the aircraft or to fly it in a separate aircraft. It will be appreciated that the tracking of the trailed coil or the separate aircraft becomes an important problem in order to minimize relative transmitter-receiver coil movement, and further, the elimination or minimizing of the effects produced by such relative transmitter-receiver coil as occurs is equally an important problem.

According to the invention the effects of relative transmitter-receiver coil movement and hence coupling in a single frequency system are minimized by arranging the coils so that during movement in carrying out the survey they are disposed in co-planar relation for maximum coupling, whereby the coupling varies only according to a cosine function of the angle of deviation from co-planar relation under any relative coil movement which may occur.

In this connection according to the invention a cancellation signal is delivered to the receiver coil from the transmitter coil to cancel out in the receiver the direct pickup from the transmitter coil resulting from the co-planar relation of the coils.

Further according to the invention the receiver coil is mounted in a novel "bomb" or "drogue" towed behind the aircraft having a high degree of tracking stability to minimize the relative transmitter receiver movements and further to render the towing of the bomb safe so that the aircraft can be flown and manoeuvred without danger to personnel.

Inasmuch as relative transmitter-receiver coil movement cannot be entirely eliminated, the invention further employs, in conjunction with the means of minimizing such movement and its effects in a single frequency system, a detector capable of detecting the out-of-phase or time lagging component of the secondary field so that even weak secondary fields can be detected and distinguished in the presence of signals of even substantially larger amplitude resulting at the receiver by virtue of relative transmitter-receiver coil movement.

According to a further feature of the invention the out-of-phase component of the secondary field detected by the receiver coil at the bomb is delivered to the aircraft as a high frequency signal for recording and observation. With this arrangement it has been found possible to use a single cable to tow the receiver bomb from the aircraft, carry the cancellation signal from the transmitter coil in the aircraft to the receiver coil, form a radio frequency link between the bomb and the aircraft for the received signal which is converted to a high frequency signal, and to further carry to the bomb the direct current power required by the electrical components mounted in the bomb.

This aspect of the invention, enabling the use of the single cable, of course, adds substantially to the facility of towing the bomb or drogue both from the standpoint of letting it in and out and also from the standpoint of increasing its aerodynamic stability. In this connection, it will be appreciated that the length of even a single cable required to tow a bomb or drogue at a distance of several hundred feet behind the aircraft offers substantial resistance to the air and without the feature of using a single cable according to the invention, the use of the cancellation signal and out-of-phase measurements would require a system that would be aerodynamically unwieldy.

In addition to arranging the transmitter and receiver coils in co-planar relation, according to the preferred form of the invention, these coils are also oriented so that their planes are vertical whereby the linkage or coupling with vertically dipping conductor or ore bodies is augmented whereas the linkage or coupling with flat bodies, which are usually non-valuable conductors such as swamps and muskeg is minimized.

In prospecting for conductor bodies it will be understood that as a general rule the commercially valuable ore bodies will be of higher conductivity than the non-valuable conductor bodies which may be too highly disseminated for mining or which may, for instance, be swamp or wet clay. As the bodies of higher conductivity are more readily distinguished by the use of lower frequencies, another feature of the invention resides in the ability to use a single low frequency signal within the range of approximately 100 to 200 cycles per second and still obtain a signal at the receiver coil which can be detected in the presence of the primary field despite the reduction in signal strength resulting from the use of such low frequency.

A further feature of the invention resides in measuring the in-phase component of the secondary field in conjunction with the out-of-phase secondary field component to provide additional information on the conductor detected.

These and other objects and features of the invention will become apparent to those skilled in the art when taken in conjunction with the accompanying drawings, in which.

Figure 1:
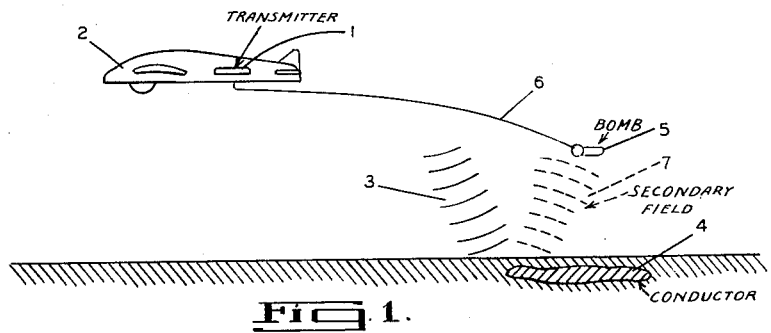
FIGURE 1 is a diagrammatic elevational view illustrating the manner in which electromagnetic prospecting is carried out according to the invention.
Figure 2:
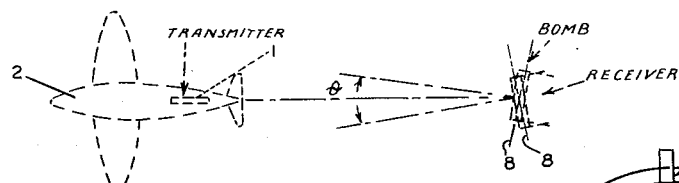
FIGURE 2 is a plan view of the aircraft and trailed receiver unit or bomb of FIGURE 1 illustrating the angular deviations which the bomb may experience in flight.

With reference to FIGURES 1 and 2, electromagnetic prospecting is carried out by employing a transmitter coil 1 mounted in an aircraft 2 and transmitting a primary field indicated by the lines 3 to link with a subterranean conductor or ore body 4. A receiver unit or "bomb" 5, as it is known in the field, is trailed behind the aircraft by means of a tow cable 6 comprising a conventional single conductor shielded cable to detect any secondary magnetic field indicated by the lines 7 created by the cutting of the conductor or ore body 4 by the primary magnetic field 3.

According to the present invention, the system is a single frequency one, with the transmitter emitting a low frequency magnetic field as hereinafter more fully discussed. Also according to the invention, the transmitter coil 1 is arranged to extend longitudinally of the aircraft 2 so that its plane, which, in the preferred form of the invention, is vertical, extends parallel to the direction of flight of the aircraft while the axis of the coil is perpendicular to the flight of the aircraft.

The receiver unit or bomb 5, hereinafter more particularly described, includes a receiver coil 8 which is arranged with the aircraft and receiver unit in flight as illustrated in FIGURES 1 and 2 so that it is co-planar with the transmitter coil 1; that is, so that its plane is parallel to the direction of flight of the aircraft and its axis is perpendicular to the direction of flight. The transmitter and receiver coils, 1 and 8, respectively, are thus disposed for maximum coupling. This relationship is established so that deviations of the receiver unit or bomb from straight line flight, that is, deviations in tracking with consequent deviations of the receiver coil 8 out of the plane of the transmitter coil, will be minimized. This minimization is achieved by arranging the transmitter and receiver coils in the co-planar relation for maximum coupling with the angle $\theta$, FIGURE 2, at zero.

Figure 3:
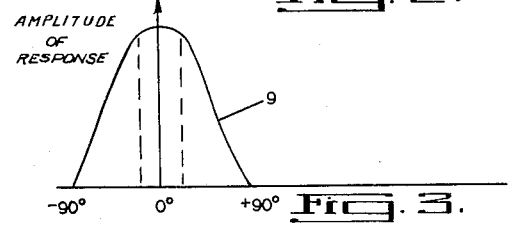
FIGURE 3 is a diagram showing the plot of receiver coil response for change in angle $\theta$ representing the deviation of the receiver coil from its normally co-planar relation with the transmitter coil.

The effects of deviation of the angle $\theta$ from zero are a cosine function, as illustrated in FIGURE 3, wherein curve 9 shows maximum signal amplitude, that is, maximum coupling for $\theta=0°$ and shows the changes in coupling which initially are small, as $\theta$ varies between plus 90 degrees and minus 90 degrees. The co-planar relationship of the transmitter and receiver coils to minimize the effects of relative movement therebetween, as above explained, disposes the coils so that the receiver coil is at its position for maximum pick-up of the primary magnetic field emanating from the transmitter coil. Inasmuch as the primary field direct pick-up by the receiver coil will normally have a substantially greater signal strength than the secondary magnetic field emanating from the conductor body, the existence of the total secondary field normally cannot be detected in the presence of the stronger primary field at the receiver coil. The present invention overcomes this problem in two distinct ways.

First, a cancellation signal is transmitted from the aircraft to the receiver unit 5 to cancel out the direct pick-up of the primary field by the receiver coil 8. In the absence of any variations in the relative position of the transmitter coil 1 and receiver coil 8 any resulting signal from the receiver coil will be due to the presence of the secondary field. Inasmuch as, of course, it is not possible in practice to maintain the transmitter and receiver coils constantly in their same relative position, particularly in turbulent air conditions, some resultant signal due to variations in the direct pick-up of the primary field will be obtained from the receiver coil 8.

If the secondary field signal is a relatively weak one, such as may be provided by a very deep conductor body or by the flying height requirements of the aircraft due to the nature of the terrain, then, despite the fact that the effect of the relative movement of the transmitter and receiver coils has been minimized by arranging them in a co-planar relationship, the primary field pick-up may still swamp out the secondary field. To overcome this aspect of the problem, the invention makes use of the fact that when the primary field cuts or links with a conductor body there is an out-of-phase component as well as an in-phase component in the resulting secondary field. According to the invention, therefore, measurement is made of the out-of-phase component of the secondary field, and, despite the fact that its magnitude may be small in comparison with direct pick-up by the receiver coil of the primary field, its existence can still be detected in the presence of the primary field by virtue of its time delay with respect to the primary field pick-up.

Figure 4:
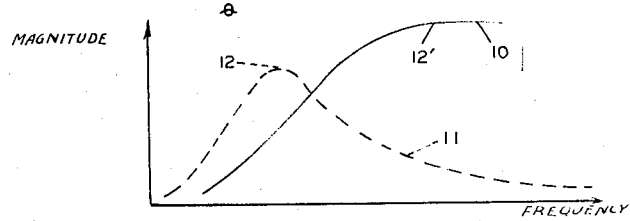
FIGURE 4 is a plot of the response in the receiver coil from a given conductor body as the frequency of the primary field cutting the body is varied, the in-phase response being shown in solid line and the out-of-phase response being shown in dotted line.
Figure 9A:
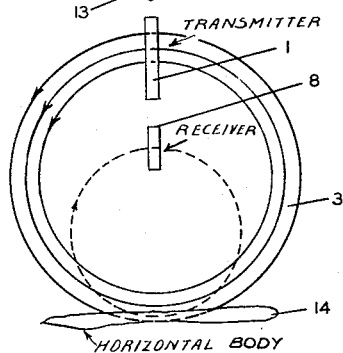
FIGURE 9a is a view similar to FIGURE 9, but showing the relatively small coupling between the vertical transmitter and a thin horizontal conductor body, and also the relatively small coupling between the horizontal body and the receiver.

Referring to FIGURE 4, the solid line curve 10 represents the variation in the magnitude of the in-phase component of the secondary field with change in frequency, and the dotted line curve 11 represents the change in magnitude of the out-of-phase component of the secondary field with change in frequency of the exciting or primary field cutting a given conductor.

As will be seen from curve 10, as the frequency of the primary or exploring magnetic field is increased, the in-phase component increases until saturation occurs. In the case of the out-of-phase component, the amplitude increases to a maximum at 12 and then decreases.

Figure 5:
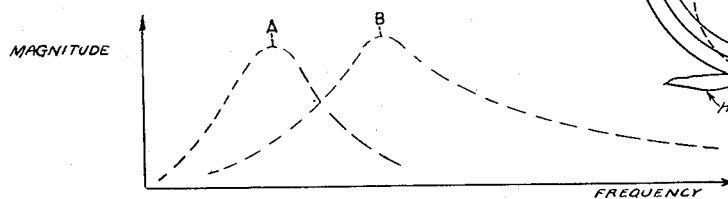
FIGURE 5 is a diagram illustrating the response produced in a receiver coil by the out-of-phase component of the secondary field created by a primary field cutting different conductors, curve A showing the response with change in primary field frequency for a relatively good conductor, and curve B showing the response with changing frequency for a relatively poor conductor.
Figure 6:
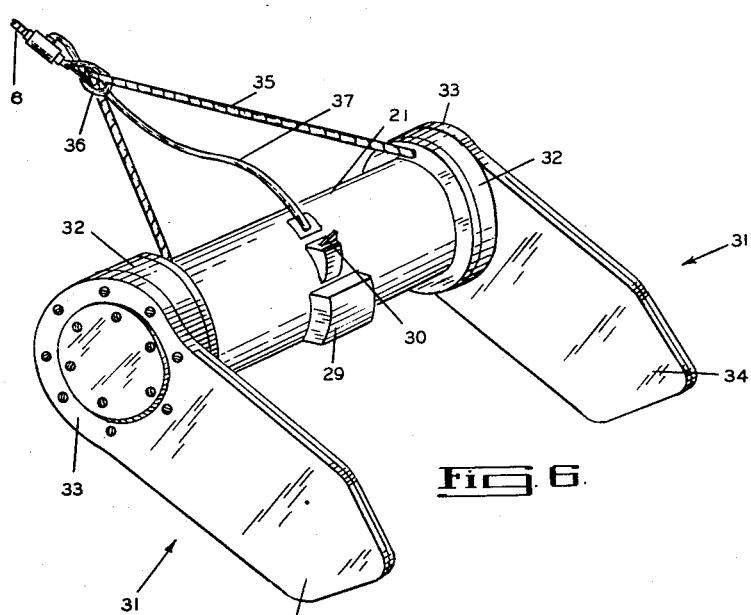
FIGURE 6 is a perspective view illustrating the receiver unit or bomb which is adapted to be trailed behind the aircraft.
Figure 7:
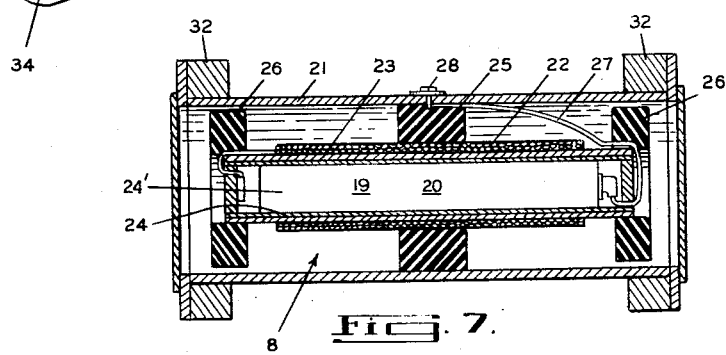
FIGURE 7 is a longitudinal mid-vertical sectional detail taken through the body of the bomb.

FIGURE 4 depicts the change in magnitude of the secondary field components with change in frequency for a given conductor, whereas FIGURE 5 depicts the change in magnitude of the out-of-phase component of the secondary field with change in frequency of the primary or exploring magnetic field for different conductors. Curve A shows the variations in the out-of-phase component of the secondary field for a relatively good conductor, while curve B shows the variations in the magnitude of the out-of-phase component of the secondary field of a relatively poorer conductor.

In the case of both the good and poorer conductors, a plot of the variations in the in-phase component of the secondary field with frequency would produce a curve similar to the solid line 10 with the curve for the better conductor reaching its maximum point, such as the point 12′, in FIGURE 4, that is, the point of saturation, at a somewhat lower frequency than the poorer conductor.

Due to the fact that the out-of-phase component has a distinct maximum for a particular frequency of the primary field, it will be appreciated from FIGURE 5 that by choice of the frequency of the primary field, good and poorer conductors can be distinguished. Curve B represents, for instance, the out-of-phase response that may be obtained from a swamp, a body of wet clay or muskeg or the like, whereas curve A represents the out-of-phase response that may be obtained from sulphide conductors and other conductor bodies of interest. It will therefore be appreciated that if the transmitter 1 is operated at the lower frequencies, the better conductors which are of interest will produce a substantial out-of-phase secondary field component or response, whereas the poorer conductors such as swamps will afford very little response.

However, as the frequency of the transmitted primary field is lowered, the field intensity which is a function of frequency is reduced at points remote from the transmitter and hence the intensity of the low frequency primary field at the conductor will be relatively smaller than if the higher frequency primary field were used, with the result that the response from the conductor, that is, the secondary field created by the cutting of the conductor by the primary field, is reduced. However, with the cancellation of the direct pick-up of the primary field by the receiver coil and the measurement of the out-of-phase component of the secondary field, relatively weak secondary fields can be detected, and it has been found that excellent results can be achieved with the transmitter operating at a frequency within the frequency range of 100 to 200 cycles per second, and preferably 140 to 200 cycles per second.

However, it will be understood that in certain instances, poorer conductors giving response at higher frequencies may be of interest and the transmitter may be operated at substantially higher frequencies within the low frequency range, as will be understood by those skilled in the art.

Figure 9:
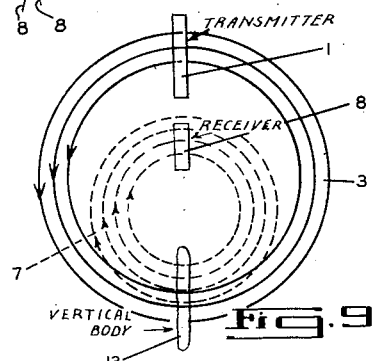
FIGURE 9 is a diagram illustrating in solid lines the coupling of the primary field created by the vertically arranged transmitter coil with a vertically disposed conductor body, and also illustrating in dotted lines the coupling of the secondary field emanating from the conductor with the vertically disposed receiver coil.

In addition to the use of the selection of frequency of the system to distinguish between good and poor conductors, the orientation of the transmitter and receiver coils, so that their planes are vertical, further assists in distinguishing between conductors of interest and those such as swamps, extents of wet clay and the like, which are of no commercial value. In this connection it will be understood that as ore normally occurs, it will have a limited width and will, in part, be of a dipping or vertical nature. As shown in FIGURE 9, such an ore body indicated at 13 will be disposed for maximum coupling with the transmitter coil 1 and the primary field 3 indicated by the solid lines cutting the conductor body 13 will produce the secondary field 7 indicated by the dotted lines, and again, the receiver coil 8 will be in position for maximum coupling with the ore body to give maximum response.

Where, however, the transmitter and receiver coils 1 and 8 are towed over a surface conductor 14 such as a swamp, which will be flat or horizontally lying, the conductor 14 will be in a position for minimum coupling with the primary field 3 so that there will be but a small secondary field 7, and again, the receiver coil 8 will be at a position of minimum coupling with the conductor 14 so that the effect of the secondary field will be minimized.

Figure 8:
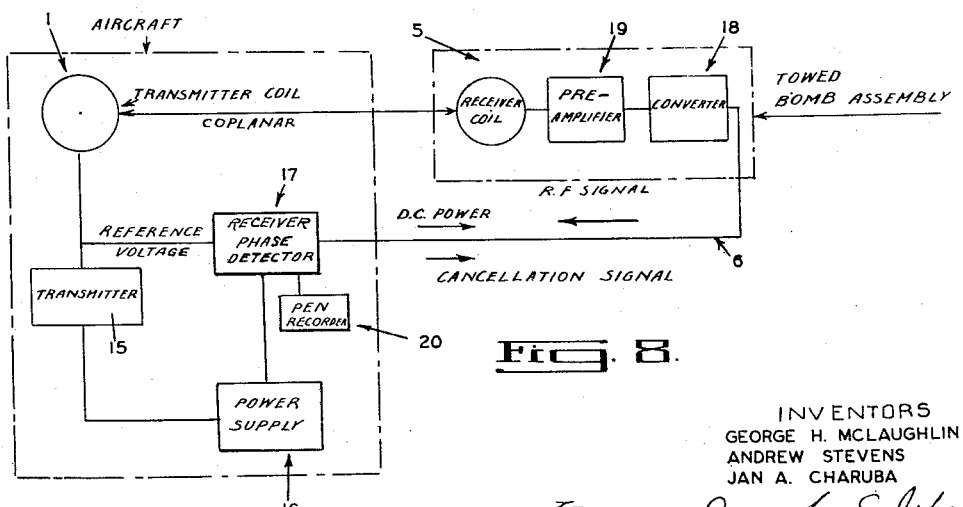
FIGURE 8 is a block diagram illustrating diagrammatically the circuit components of the electromagnetic system.

With reference to FIGURE 8, the system is shown in block form with the transmitter coil 1 being shown energized by a transmitter 15 operated from a power supply 16 carried in the aircraft. A reference voltage is picked off from the transmitter 15 and delivered through a suitable phasing network included in the receiver and phase detector assembly indicated at 17 and along the tow cable 6 to the receiver unit or bomb 5. At the same time, to simplify the components in and the electronic system of the receiver unit 5, D.C. power is also delivered via the tow cable 6 to the components in the bomb 5.

Inasmuch as the advantages to be derived by orienting the transmitter and receiver coils in co-planar relation so that the effects of deviation in relative orientation will be minimized, are dependent upon maintaining the coils against extremely large deviations from their co-planar relation, the tracking ability of the receiver unit or bomb 5 is important. In this connection, the tracking stability of the bomb can be nullified by the effects of the connections between the bomb and aircraft, since the bomb is usually trailed at a distance of several hundred feet, perhaps of the order of 500 feet behind the aircraft, and the air resistance of the connecting cables becomes substantial with respect to the bomb. To enable the use of a single cable, the invention therefore provides a means in the form of a converter 18 in the receiver unit or bomb 5, which converts the signal resulting from the pick-up of the receiver coil after application of the cancelling signal from the aircraft to an appreciably higher frequency signal, preferably a radio-frequency signal of the order of 50,000 cycles per second.

Prior to conversion, the resultant signal from the receiver coil, which will be made up of any uncancelled signal resulting from direct pick-up of the primary field and the in-phase and out-of-phase components of the secondary field, is amplified in a preamplifier 19. The converter 18 may be of any desired type, and for instance, the low frequency resultant signal delivered from the preamplifier to the converter may be used to modulate the radio-frequency signal, and the tow cable 6 then forms a capacitive or R.F. coupling to transfer the radio-frequency signal to the receiver and phase detector assembly 17 without requiring any radio-frequency transmitting equipment in the bomb. Thus, the tow cable 6 performs the multiple functions of mechanically towing the receiver unit or bomb 5, forming the electrical connection for the cancellation signal and the D.C. power to the bomb, and forming the circuit element coupling the R.F. signal from the bomb to the receiver. The receiver and phase detector assembly 17 may be of any conventional type which will demodulate the R.F. signal arriving from the bomb and the resultant demodulated signal corresponding to the resultant signal from the receiver coil will then comprise, again, an in-phase component made up of any direct pick-up resultant from the primary field, the in-phase component of the secondary field and the out-of-phase component of the secondary field.

By detecting the out-of-phase component, the existence of such secondary field, and hence a conductor giving rise to such secondary field, is determined, and the detected out-of-phase secondary field may be recorded as for instance by a pen recorder 20, or any other suitable means.

It will be appreciated that if weather conditions are calm and cancellation of the direct pick-up by the receiver coil complete, the in-phase component of the demodulated signal received by the receiver will also indicate the presence of a secondary field, and this in-phase component may also be recorded if desired. It will be understood that particularly in turbulent weather conditions the in-phase signal in the receiver assembly 17 will comprise or include direct pick-up of the primary field by the receiver coil 8.

To provide the tracking stability desired, the receiver unit or bomb 5 is of novel construction comprising an outer cylindrical casing 21 formed of suitable non-conducting material and resiliently mounted substantially co-axially within the casing 21 is the receiver coil 8. This coil 8 comprises windings 22 wound over longitudinal steel laminations 23 disposed in insulated side-by-side relation around a hollow coil form or core 24 of a suitable non-conducting material. The coil 8 is held in position centrally of its length by means of an annular pad 25 of soft sponge rubber. Annular discs 26 of similar material are mounted on the ends of the coil form 24 and these discs are slightly less in diameter than the inner diameter of the outer casing 21, so that they restrict or limit, but do not prevent angular motion of the receiver coil in the earth's magnetic field. It has been found that this arrangement prevents microphonics which can present a serious problem where high amplification is required as, for instance, in the present invention in the detecting of weak signals at the receiver coil.

Arranged within the hollow coil form 24 in a suitable housing 24' are the preamplifier and converter components 18 and 19 and the connections from these components are made through a suitable lead 27 to a plug-in receptacle or jack 28 provided on the casing 21.

While cable 6 forms a means of supplying D.C. power to the bomb 5, in certain instances it may be desirable to supply the D.C. power required by the bomb components from batteries located in the bomb. Where batteries are so used they may be stored in a battery box 29 provided on the casing and operated by switch 30. When recharging is required, the current can be applied to the batteries through cable 6.

The receiver unit or bomb 5 is adapted to be towed with the axis of the casing 21 and hence the axis of the receiver coil 8 perpendicular to the direction of the line of flight, and to provide a stable unit it has been found that in conjunction with the cylindrical form of the casing 21, a pair of fins 31 located one at each end of the casing, and extending rearwardly therefrom in spaced parallel relation provide excellent tracking stability. To augment the balance of the bomb, it has been found that by applying annular weights 32 around the casing at the ends thereof, the tracking or aerodynamic stability is augmented and the advantages accruing from the transmitter-receiver coil relationship above described can be obtained.

It will be understood that the weights 32 may be secured to the casing in any suitable manner, and the fins 31 may conveniently be formed as annular portions 33 disposed concentrically with the ends of the casing 21, and, for instance, bolted to the weights 32, and broad flat trailing portions 34.

The tow cable 6 is connected to the bomb 5 by suitable cord 35 connected to the cable by a suitable anchor 36 and, in turn, anchored as a Y-suspension to the bomb. Electrical connection is made from the tow cable through the receptacle 28 by means of a suitable lead 37.

In the operation of the system, it will be appreciated that the receiver unit or bomb 5 must be pulled up to the aircraft to land, and must be released after take-off to carry out the survey. In this connection, it will be appreciated that in addition to the aspect of providing minimum air resistance and minimum effect on the tracking of the bomb 5, the single tow cable 6 renders the reeling in and letting out of the bomb a much simpler task than would be the case if several cables were required.

In carrying out a survey, it will be understood that the aircraft may be arranged to fly in any desired pattern and the position of the aircraft recorded in relation to the signals received from the receiver unit.

It will be understood that various changes in detail and modifications will be apparent to those skilled in the art without departing from the spirit of the invention as set forth in the appended claims.

What we claim as our invention is:

1. In the carrying out of an electromagnetic survey from aircraft the step of transmitting a low frequency primary magnetic field by means of a transmitter coil maintained with the plane of its turn substantially vertical and detecting at least any out-of-phase component of any secondary magnetic field created by the linkage of said primary field with a conductor body by means of a receiver coil trailed behind the aircraft and disposed so that the turns of said receiver coil are substantially vertical and co-planar with the turns of said transmitter coil for maximum direct coupling therewith.

2. An airborne electromagnetic prospecting method comprising transmitting a low frequency primary magnetic field by means of a transmitter coil mounted in an aircraft and maintained with the plane of its turns substantially vertical, detecting any secondary magnetic field created by the linking of said primary field with a conductor body by means of a detector coil trailed behind said aircraft and disposed so that the turns of said receiver coil are substantially vertical and co-planar with the turns of said transmitter coil for maximum direct coupling therewith, and at least substantially cancelling out the response of said receiver coil to said primary field by direct pick-up from said transmitter coil.

3. An airborne electromagnetic prospecting method comprising transmitting a low frequency primary magnetic field by means of a transmitter coil mounted in an aircraft and maintained with the plane of its turns substantially vertical, detecting at least any out-of-phase component of any secondary magnetic field created by the linking of said primary field with a conductor body by means of a receiver coil trailed behind the aircraft and disposed so that the turns of said receiver coil are substantially vertical and co-planar with the turns of said transmitter coil for maximum direct coupling therewith, substantially cancelling out in the receiver coil direct receiver coil pick up of the primary field resulting from the substantially co-planar relation of the transmitter coil and receiver coil turns, and transmitting to the aircraft any resulting signal from the receiver coil.

4. A method as claimed in claim 3 in which the primary magnetic field is transmitted at a frequency within the range of approximately 100 cycles per second to 200 cycles per second.

5. A method as claimed in claim 3 in which the receiver coil is trailed behind the aircraft by means of a single load carrying conducting tow cable and a cancellation signal is transmitted by means of said cable from said transmitter coil to said receiver coil to cancel direct primary field pick-up by said receiver coil and any resulting signal from said receiver coil is transmitted as a high frequency signal via said single cancellation signal carrying cable to said aircraft.

6. In the carrying out of an airborne electromagnetic survey for subterranean conductor bodies, the steps of transmitting a low frequency magnetic field from an aircraft by means of a transmitting coil disposed with its turns substantially vertical, detecting by means of a receiver coil trailed behind the aircraft by means of a load carrying conducting tow cable connected to said aircraft and said receiver coil, said receiver coil being disposed so that the turns of said receiver coil are substantially vertical and co-planar with the turns of said transmitter coil any secondary magnetic field created by said primary field cutting a subterranean conductor in the vicinity, delivering a low frequency signal to said receiver coil via said tow cable to at least substantially cancel out direct pick-up by said receiver coil of said primary field, converting any resultant signal from said receiver coil into an appreciably higher frequency and transmitting such higher frequency signal to said aircraft via said same low frequency signal carrying tow cable, demodulating such high frequency signal in said aircraft and detecting at least any out-of-phase component of the demodulated signal to indicate the presence of a secondary field and hence conductor body.

7. In the carrying out of an airborne electromagnetic survey for subterranean conductor bodies, the steps of transmitting a low frequency magnetic field from an aircraft by means of a transmitter coil having the plane of its turns disposed substantially vertical and lengthwise of the aircraft, detecting, by means of a receiver comprising a receiver coil trailed behind the aircraft by means of a load carrying conducting tow cable connected to said aircraft and to said receiver coil and disposed with its turns in co-planar relation with the turns of the transmitter coil for maximum coupling therewith, any secondary magnetic field created by said primary field cutting a subterranean conductor in the vicinity, delivering a cancellation signal to said receiver via said tow cable to at least substantially cancel out direct pick-up of said primary field by said receiver coil, converting any resultant signal from said receiver into an appreciably higher frequency signal and transmitting such appreciably higher frequency signal to said aircraft via said load and cancellation signal carrying tow cable, demodulating said higher frequency signal in the aircraft to recover said resultant signal, and measuring at least any out-of-phase component of said resultant signal as an indication of the presence of a conductor body.

8. A method as claimed in claim 7 in which the primary magnetic field transmitted comprises a field having a frequency within the range of substantially 100 cycles per second to 200 cycles per second.

9. A method as claimed in claim 7 in which direct current power is delivered by said tow cable from said aircraft to said receiver.

10. Apparatus for electromagnetic prospecting comprising a receiver unit for trailing from aircraft comprising a cylindrical casing of non-conducting material, a receiver coil, resilient means supporting said receiver coil within and disposed substantially coaxially of said casing, and a pair of parallel substantially planar stabilizing fins arranged one at each end of said casing and extending in a direction and having their planes perpendicular to the axis of said casing.

11. Apparatus for electromagnetic prospecting comprising a receiver unit for trailing from aircraft comprising a cylindrical casing of non-conducting material, a cylindrical coil form of non-conducting material resiliently supported within and disposed substantially coaxially of said casing, a coil wound on said coil form, a concentric annular weight mounted on each end of said cylindrical casing, a substantially planar stabilizing fin secured to each end and extending radially to one side of said casing, the planes of said fins being parallel and perpendicular to the axis of said casing and said fins being arranged in spaced opposing relation, and means for attachment to a tow cable whereby said casing may be towed in a direction substantially perpendicular to the casing axis with said fins trailing and parallel to the direction of flight.

12. A device as claimed in claim 11 in which said coil is wound on longitudinal steel laminations.

13. A device as claimed in claim 11 in which an amplifier for amplifying signals from said coil and a converter device for converting the frequency of such amplified signals is mounted within said coil form.

14. A receiver system for use in airborne electromagnetic prospecting comprising a receiver unit including a receiver coil mounted between spaced parallel substantially planar fins with the axis of said receiver coil perpendicular to the planes of said fins, a conducting cable for towing said receiver coil from an aircraft with said fins trailing and lying substantially parallel to the direction of flight, a source of direct current power for mounting in an aircraft and connected via said cable to said receiver unit, means for applying a low frequency cancellation signal to said receiver unit via said same cable, said receiver unit having a converter to convert signals received by said receiver coil to high frequency signals and to transmit such converted high frequency signals via said same cable to said aircraft, and means adapted to be mounted in an aircraft for demodulating such converted signals.

References Cited in the file of this patent

UNITED STATES PATENTS

| | | |
|---|---|---|
| 1,837,245 | Wheeler | Dec. 22, 1931 |
| 2,085,585 | Hamilton | June 29, 1937 |
| 2,440,737 | Cawein | May 4, 1948 |
| 2,573,133 | Greer | Oct. 30, 1951 |
| 2,652,530 | Davidson | Sept. 15, 1953 |
| 2,673,961 | Williamson | Mar. 30, 1954 |
| 2,741,736 | Puranen et al. | Apr. 10, 1956 |

FOREIGN PATENTS

| | | |
|---|---|---|
| 507,468 | Canada | Nov. 23, 1954 |
| 204,351 | Australia | Nov. 16, 1956 |